United States Patent
Johnson et al.

(10) Patent No.: US 10,140,473 B2
(45) Date of Patent: *Nov. 27, 2018

(54) STORAGE AND PRIVACY SERVICE

(71) Applicant: Facebook, Inc., Menlo Park, CA (US)

(72) Inventors: Robert Carlton Johnson, Palo Alto, CA (US); Stephen Charles Heise, Mountain View, CA (US); Yiding Jia, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 15/495,761

(22) Filed: Apr. 24, 2017

(65) Prior Publication Data

US 2017/0228560 A1  Aug. 10, 2017

Related U.S. Application Data

(63) Continuation of application No. 13/449,177, filed on Apr. 17, 2012, now Pat. No. 9,665,393.

(51) Int. Cl.
  *G06F 21/62* (2013.01)
  *H04L 29/06* (2006.01)
  *G06F 9/46* (2006.01)
  *G06F 21/60* (2013.01)

(52) U.S. Cl.
  CPC .......... *G06F 21/6245* (2013.01); *G06F 9/468* (2013.01); *G06F 21/604* (2013.01); *H04L 63/102* (2013.01); *H04L 63/20* (2013.01)

(58) Field of Classification Search
  CPC ... G06F 21/6245; G06F 21/604; H04L 63/102
  See application file for complete search history.

(56) References Cited

U.S. PATENT DOCUMENTS

| | | | |
|---|---|---|---|
| 6,823,299 B1* | 11/2004 | Contreras | G06F 8/24 345/419 |
| 2003/0135500 A1* | 7/2003 | Chevrel | G06F 17/3089 |
| 2004/0030707 A1* | 2/2004 | Lu | G06F 17/30575 |
| 2006/0253420 A1* | 11/2006 | Hinton | G06F 21/62 |

\* cited by examiner

*Primary Examiner* — Meng Li
(74) *Attorney, Agent, or Firm* — Baker Botts L.L.P.

(57) ABSTRACT

In one embodiment, a method includes storing code defining access control rules for an object, the code defining each of the access control rules as a set of operations that each returns (1) when resolved, a predetermined result, and (2) when not resolved, a not definitive result indicating that it should be skipped if it is not necessary for determining the access control rule; compiling the code; compiling and loading the code; receiving a query for the object; executing the code to evaluate the corresponding operations; determining, for each access control rule, a rule-result comprising a value representing a true or a false value; determining a final result based on the one or more rule-results of the one or more access control rules, the final result indicating an allow-result or a deny-result; and sending the object when the final result evaluates to an allow-result.

18 Claims, 3 Drawing Sheets

STORAGE AND PRIVACY SERVICE

PRIORITY

This application is a continuation under 35 U.S.C. § 120 of U.S. patent application Ser. No. 13/449,177, filed 17 Apr. 2012.

TECHNICAL FIELD

This disclosure generally relates to an information storage and retrieval system and more specifically relates to storing and controlling access to information associated with individual users in a distributed system.

BACKGROUND

A network-based system may support any number of users, and the system may provide various services to its users or enable its users to perform various activities either with respect to the system or with each other through the system. Typically, each user establishes a user account with the system, and is identified with a unique user identifier (ID). Each user account may be protected with a password for security purposes. A user may log into an account with the system by submitting the correct combination of user ID and password associated with the account.

There may be information associated with individual users stored with the system (e.g., in connection with the corresponding user accounts). Each user may upload and submit information to the system. The system may store each user's information on behalf of that user and in association with that user. The user may access his information stored with the system. In addition, the user may choose to grant other users access to his information stored with the system.

DESCRIPTION OF EXAMPLE EMBODIMENTS

A network-based system may support any number of users. In particular embodiments, such a system may provide various services to its users or enable its users to perform various activities either with respect to the system or with each other through the system. For example, each user may store information with the system and access his stored information when desirable. Each user may also choose to grant other users access to his information stored with the system.

A social-networking system is an example of such a system. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their users to perform various social activities. For example, the web-based social-networking system operated by Facebook, Inc. at www.facebook.com (hereafter "the Facebook system") enables its users to communicate with their friends via emails, instant messages, or blog postings, organize social events, share photos, receive news of their friends or interesting events, play games, etc.

Figure 1:
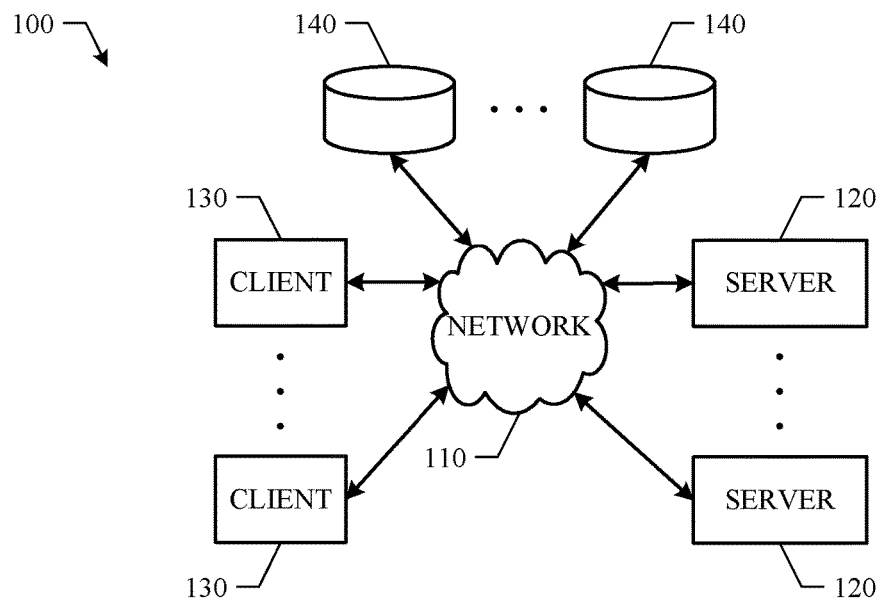
FIG. 1 illustrates an example distributed system.

In particular embodiments, the network-based system is a distributed system (e.g., a systems that consists of multiple devices that communicate and interact with each other through a computer or communication network). FIG. 1 illustrates an example distributed system 100. System 100 may include any number of electronic devices; some of which may function as servers 120, some of which may function as clients 130, and some of which may function as storages 140 (e.g., databases or data stores). Individual servers 120, clients 130, and storages 140 may be communicatively linked by a computer or communication network 110, which may include any number of sub-networks of various types. In particular embodiments, servers 120, clients 130, and storages 140 may be physically located at different geographical locations. Moreover, some clients 130 (e.g., mobile devices) may roam around and may be located at different locations at different times. Servers 120 may together implement and host services and functionalities supported by system 100. For example, system 100 may be a web-based social-networking system. In this case, server 120 may implement services and functionalities applicable to the social-networking system. A specific server 120 may service a number of specific clients 130. A specific client 130 may be associated with a user of system 100 and enables (e.g., through software applications executing on client 130) the user to access services provided by system 100. A number of storages 140, accessible to specific servers 120 or clients 130, may be used to store user and other types of information (e.g., system information, operation rules) associated with system 100. In particular embodiments, storage 140 may implement a heterogeneous storage system where multiple types of databases and storage systems may be combined (e.g., MySQL, memcache, haystack, hbase, and TAO). The software language (referred to as SPS language and described in more detail below) provides storage agnostic means to load data from storages 140.

In particular embodiments, servers 120 may each have a server shell for executing specific code (e.g., code for information access control, such as privacy checking, tree evaluation). Servers 120 may support Apache Thrift, a software framework for scalable cross-language services development. Some server 120 may be web servers and support PHP: Hypertext Preprocessor and PHP extensions.

In particular embodiments, a user may upload and submit information (e.g., using a specific client 130) to system 100. A specific server 120 may receive the user-submitted information and store the information (e.g., in storages 140) for the user in system 100. Thereafter, the user may access his information when he desires. In addition, the user may choose to grant others (e.g., other users of system 100) access of his information stored with system 100. In particular embodiments, for each piece of information the user stores with system 100, the user may specify which other users has the right to access that piece of information and what types of access right (e.g., read, write) the other users have. In some implementations, when a user submits a piece of information to system 100, the user is considered the "owner" of and has access control over that piece of information. The user may specify whether other users can access that piece of information and if so, specifically which other users can access that piece of information. The user may modify the access control he has specified for a piece of information whenever he desires. When other users attempt to access a piece of information, system 100 only grants access to the piece of information to those specific users to whom the owner-user of the piece of information has granted access right. In some implementations, the access control associated with a piece of information, as specified by the owner-user of that piece of information, may be represented as a set (e.g., one or more) of access rules.

As an example, the Facebook system enables its users to upload content, such as images (e.g., digital photographs), audios, videos, and documents, to be stored within the Facebook system. The users may also post messages (e.g., on their account walls) and status updates, check in at specific locations or events, communicate with other users (e.g., through chat or e-mail), publish reviews (e.g., on products), and so on. All of these are different types of information. Thus, a piece of information may be, without limitation, a file (e.g., text, audio, video, executable), a message (e.g., e-mail, chat), a post, a status update, or other types of objects. Moreover, users and information pieces may be generally referred to as "objects'.

When a user submits a piece of information, the Facebook system may store that piece of information in association with the user. The individual pieces of information may be in different formats (e.g., text, audio, video, executable). Each user is considered the "owner" of the information he submits and has control over who can access his information and what kind of access the others can have of his information. In other words, each user has control over with whom to share his information. In some cases, each user may specify the access control of the information he submits to the Facebook system using privacy settings provided through his user account (e.g., either at the time of submission or at a later time). For example, when User A uploads a photograph to the Facebook system, User A has the choices of specifying (e.g., through privacy settings): (1) not sharing the photograph with anyone else (e.g., using the "Only Me" privacy setting) so that User A is the only one who can access the photograph; (2) sharing the photograph with a list of specific people; (3) sharing the photograph with only the "friends" of User A (e.g., the social connections specified in his user account); (4) sharing the photograph with the "friends" of the "friends" of User A; or (5) sharing the photograph with the general public. Subsequently, suppose that User B attempts to access (e.g., view) the photograph submitted by User A. If User A has specified that the photograph is only shared with the "friends" of User A (i.e., only the "friends" of User A can view the photograph) and User B is not a "friend" of User A, then the Facebook system denies User B access to the photograph. On the other hand, if User A has specified that the photograph can be shared with the general public, then the Facebook system grants User B access to the photograph.

In particular embodiments, the functionalities implemented in system 100 may be organized into a multi-layered or multiple-tiered hierarchy. Different servers 120 and storages 140 may implement functionalities at different tiers. For example, one tier (e.g., the web tier) of the hierarchy may include specific functionalities related to receiving and responding to requests sent from clients 130. Another tier of the hierarchy may include specific functionalities related to core system operations. A third tier (e.g., the "storage" tier) of the hierarchy may include specific functionalities related to information storage and management. In some implementations, information stored with system 100 may be protected with various safety measures (e.g., replication, failover) so that the information is not corrupted or lost due to software, hardware, or network problems occurred at some parts of system 100.

There are different means for system 100 to ensure and enforce access control of the information stored therein according to the access rules specified by the users who are the owners the information. In particular embodiments, system 100 may implement and provide server-side or client-side code that enables clients 130 to access functionalities supported by servers 120. In some implementations, the server-side code may be implemented using PHP, a general-purpose server-side scripting language.

In some embodiments, when a user wishes to access a piece of information (e.g., a blog post) stored in system 100, a client 130 associated with the user may send a request for that piece of information to a server 120 by invoking an appropriate server-side script implemented using PHP. The functions implemented by the PHP code may include verifying and validating access control of the piece of information with respect to the requester-user. The piece of information is sent to the client 130 associated with the user only when the requester-user has been granted access to the piece of information (e.g., by the owner-user of the piece of information).

In this case, some script code (e.g., implemented using PHP) is responsible for ensuring and enforcing access control of the information stored in system 100. In addition, clients 130 may need to retrieve other data, in addition to the requested information, which are needed and used to help present the requested information to the users. The privacy-checking or access-control functionalities are included in the frontend (e.g., the web tier).

Alternatively, in other embodiments, the functions related to information access control are implemented at the "storage" layer of system 100, which may be referred to as the "Storage and Privacy Service" (SPS). More specifically, in some implementations, for each object (e.g., each piece of information or each user) stored in system 100, its access control, as specified by its owner-user, is represented as a set of (e.g., one or more) access or privacy rules. In this context, the terms "access rule" and "privacy rule" refer to the same concept and are used interchangeably. The access rules of each piece of information are stored in connection with that piece of information. In some implementations, the access rules of all the information stored in system 100 are stored in a data structure that may be represented as a graph having a number of nodes and edges. When a user requests a specific piece of information stored in system 100, the access control of the piece of information is verified and validated with respect to the requester-user by dynamically (e.g., in real time) filtering the graph. In some implementations, a language with a predefined syntax, which may be referred to as the SPS language, is used to express the access or privacy rules and the filtering of the graph.

In this case, the access or privacy rules are clearly defined and expressed, which makes it more difficult to violate these rules. Any modification to a specific rule or any addition or deletion of a rule may be quickly reflected in the graph. In some implementations, since system 100 is a distributed system, multiple copies of the graph may be distributed to different servers 120 or storages 140 in different parts of system 100. When a user wishes to access a piece of information stored in system 100, a client 130 associated with the user may send a request for that piece of information to a server 120. The request identifies the requester-user. The piece of information is sent to the client 130 associated with the requester-user only if the requester-user is authorized to access the piece of information (e.g., according to the access or privacy rules specified for the piece of information).

The data-fetching and access-control or privacy-checking functionalities are separated from the frontend (e.g., the web tier) and pushed down to the storage tier. There is a high-level interface to the data storage (e.g., storage for user information and data) that returns the requested objects, which have been privacy filtered based on viewer context, to the web tier (e.g., PHP code) or other clients. A high-level language is used to express a graph and access rules applied to it. This may lead to several improvements over existing means for enforcing access control of information. As one example, it provides transparency of privacy logic. The privacy language used should be understandable by almost anyone (i.e., not just software programmers). The privacy written in the high-level language may be more readable and understandable. As a second example, it simplifies product development and makes the development process easier. A number of complications are removed from the everyday life of a product developer, including privacy, sorting, paging, and the detailed performance characteristics of MySql and Memcached. This help lessens the complexity of the product code. As a third example, it improves efficiency. The separation of functionality introduces many opportunities for optimization, including the reduction of data over-fetching, improvements on batching and parallelism, doing higher level query optimization, and making it easy for systems engineers to deduce the intent of the product developers because they are now looking at high level queries instead of thousands of individual keys. In some implementations, low-level data access is moved to a pure C/C++ codebase. As a fourth example, there are choices in terms of programming languages. Access to user data is no longer locked away in the WWW codebase. Instead, any service is able to access the data efficiently using, for example, Thrift (a software framework for scalable cross-language services development). This opens up new possibilities products that can be built and architectures that can be considered. As a fifth example, it enhances operational efficiency and stability. Often, data and privacy code is more critical than frontend code to a system. By separating the data and privacy code from the frontend code, the data and privacy service may be monitored, optimized, maintained, and deployed on a completely separate schedule from the frontend code. Likewise, it is possible for globally optimizing data access patterns, rather than locally optimizing databases and caches. All of these features make the system easy to maintain.

For example, the system may: grant access to only users legally allowed to drink alcohol, grant access to one or more applications, grant access to only, those with shared experiences or shared interests, grant access to derived information, such as whether the group has an administrator or the deny reason, return a list of users allowed to see the content, including but not limited to mutual friends who are allowed access to the information, grant access to any combination of the aforementioned audiences, or impose additional access restrictions, such as restricting access to content owned by minors, children, and deceased persons may block access to certain users.

Language

In particular embodiments, a language with a predefined syntax is used to express objects (e.g., users, information), connections between specific objects, access control (e.g., access or privacy rules) associated with the information, and filtering of the graph representing the privacy rules. In some implementations, the language is a declarative language that describes users and objects, connections, and privacy rules (e.g., essentially Thrift for a graph). Different object types may be declared in this language, along with all connection types and the privacy rules associated with the objects. For clarification purposes, this language may be referred to as the SPS language.

In some implementations, the syntax of the SPS language is defined as the following. This syntax is designed for the Facebook system and thus may include a number of Facebook-specific terms. The syntax may be modified, when appropriate, to be suitable for other types of distributed systems. The terms may or may not be case sensitive (e.g., depending on the actual implementations). For example, if the terms are not case sensitive, then "Int" and "int" are considered the same term. On the other hand, if the terms are case sensitive, then "Int" and "int are considered two different terms.

The SPS language supports many features. For example, automatic data fetching may be achieved by specifying properties, edges, and fbtypes (defined below). Privacy checking when data are fetched and returned from storage may be achieved by specifying appropriate fields. Undefined values may be used to signal error conditions, such as data fetch failure, and evaluating such undefined values may help determine whether the failure is with the entire request or just a part of the request. With some implementations, the system treats a data retrieval failure as of indeterminate state; to the extent that un-retrievable data (such as due to a temporary network or equipment glitch or due to scheduled maintenance) is not strictly necessary to make an access request determination, then such failure will not deny access so long as there exists a set of definitely retrieved data that clearly authorizes the granting of access.

Type

The primitive or native types are: "Int" (integer), "String" (character string), and "Bool" (Boolean—true or false).

A parameterized type "Set" represents a set of values. A "Set" cannot contain any other "Set"; however a "Set" may contain "Nodes" or "Interfaces" which themselves contain "Sets". A parameterized type "OrderedSet" represents a set of values in a pre-determined order. A "Map" represents a relationship between primitive or native types.

The user defined types are: "Node", "Interface", "Const", and "enum" (enumeration).

A "Node" can have a null value, which indicates the "Node" having an empty value.

"Enums" are similar to their counterparts in other languages, with the exception that each value's "Int" (integer) value representation must be defined. "Enums" are typed, and can not be used in places where an integer or another "enum" value is expected.

Unknown

All values can be "Unknown". "Unknown" is introduced in the cases of data-fetch failures or attempting to access attributes of null values. Such "Unknown" values are propagated up the expression tree, and ultimately the results in a rule to be forcefully denied (if it is a deny), or skipped (if it is an allow).

Incomplete

A "Set" contains an "Incomplete" flag. A "Set" is marked incomplete (e.g., using the "Incomplete" flag) if it may contain more values, but does not because of data-fetch failures. An "Incomplete" flag modifies the results of set operations, causing them to become "Unknown".

Decoding Property Fields

The property fields returned from the distributed graph database implemented by the Facebook system, known as TAO, may have three possible states: "INT", "TEXT", and "ARRAY". When loaded, they are coerced into language types by the following rules:

"INT"➔"Int": Trivial.

"INT"➔"Object": An object whose "fbid" (Facebook ID) is the integer.

"INT"➔"String": The integer's decimal representation.

"TEXT"➔"String": Trivial.

"TEXT"➔"Int": The string is parsed as a decimal number.

"ARRAY"->"Set<Int>": The JavaScript Object Notation (JSON) input array is treated as a set of integers.

"ARRAY"➔"Set<String>": The JSON input array is treated as a set of strings.

"ARRAY"➔"Set<Object>": The JSON input is treated as an array of object IDs.

"ARRAY"➔"Object": The JSON input is treated as a set of property fields for an object, constructed recursively, with the sub-objects following the same rules. If the input is not a JSON object, return "Unknown".

All non-listed conversions return "Unknown".

For the array conversions, if the input is not an array, the result is "Unknown". If the input is an array, the items in the array should be convertible based on the "INT"/ "TEXT"➔"Int"/"String" conversions. In the event that the conversion is not possible, the item is excluded and the set is marked "incomplete".

Interface interface : 'interface' IDENT ['implements' IDENT[',' . . . ]] '{' interface_items '}' interface_item : name_decl|expr_decl|alias_decl|perm_decl|perm_def

An "Interface" is declared with a name and optionally the names of the parent "Interfaces" that it implements.

Properties and edges are optionally declared in "Interfaces". Instead, an "Interface" declares attributes that may map to a property, edge, expression, or alias in the "Nodes" that implement the "Interface". an "Interface" can also declare permission names without defining their bodies; however, these permissions must be defined in the implementing class. "Interfaces" may implement other "Interfaces".

Node node : ['extend'] 'node' IDENT ['implements' IDENT[',' . . . ]] '{' node_items '}' node_item : prop_block|edge_block|alias_decl|expr_decl|perm_def

Each "Node" defined maps to a particular object type in the underlying storage. In this context, the terms "node" or "Node" and "object" refer to the same concept and may be used interchangeably. In the case of the Facebook system, each "Node" maps to a concrete object stored in TAO or an object created at the runtime.

A "Node" has properties, which have names and types. The types can be native types (e.g., "Int", "String", "Bool") or other nodes.

A "Node" also defines the edges that are allowed to originate from them.

When the keyword "extend" is present, the body of the declaration is added to the declarations for this "Node". This lets different products add additional permissions or edges that are product specific, without having it all be put into one node-declaration block.

Additional properties cannot be added to a "Node" using "extend".

Property prop_block : 'prop' '{' prop_items '}' prop_item: type IDENT ['(' prop_options [',' . . . ] ')'] ';' prop_options : 'default' ':' static_expr|'decode' ':' IDENT

"Properties" map to the fields of the underlying object.

The "type" indicates the type of the field. When a field contains an ID (e.g., "fbid"), its "type" should be set to the type of the object.

The optional option "default" specifies a field's value if it is missing from the data. If a field is missing a value and the default is not specified, the value of the field becomes "Unknown". Default values can be a constant, literal, null, or the empty set.

The optional option "decode" specifies a named decoding function (provided by the runtime), which decodes the field's raw data and fills it with processed data. This may be useful, for example, for specifying fields of IDs stored as comma separated lists. It is mainly used for legacy reasons. The comma separated list does not support multiple IDs in a field. Instead, associations should be used for such cases.

Edge edge_block: 'edge' '{' edge_items '}' edge_item: type IDENT ';'

"Edges" typically represent associations in the underlying data model.

Generally, the type of an "Edge" is a "Set" of nodes. If the type is a node type instead of a set, then one arbitrary object from the association becomes the value of this edge. If there is no association, the value of the edge becomes null.

The actual mapping of an "Edge" to the underlying association is specified in the "sources" block.

Each "Edge" is stored as a 3-tuple: (object1_id, edge_type, object2_id). The name of the "edge_type" and the name of the type of node the edge leads to are specified.

"Edges" can either be singletons or sets.

There can be multiple edges to the same type with different names. These edges are stored as different "edge_types" in the underlying storage (e.g., TAO in the Facebook system). A separate file (e.g., called_sources.fbobj in the Facebook system) specifies the IDs for object types and edge types in the underlying storage, so the system knows how to load these objects.

Named Expression expr_decl: type IDENT=expr ';'

Named expressions are attributes computed from other attributes. A "Named Expression" can be used in the same way as other types of attributes.

An expression has access to all the bindings that are available to expressions inside permissions.

The value of an expression is lazily computed and cached for each object.

Inside a "Named Expression" block, the following bindings may be used:

viewer_context: an object representing the current viewer context;

viewer: the IUser object representing, generally shorthand for "viewer_context.user";

this: the object on which the rule is invoked; and that: if the permission takes an argument, then this is the target object when invoked to do an edge traversal permission check.

Permission perm_def : 'perm' IDENT ['(' type ')'] '{' statements '}'

Permissions are functions that return Boolean ("Bool") values. A "Permission" may be defined to take an optional argument, which is set to the target object when computing permission on an edge traversal.

Inside a "Permission" block, the following bindings may be used:

viewer_context: an object representing the current viewer context;

viewer: the IUser object representing, generally shorthand for "viewer_context.user";

this: the object on which the rule is invoked; and that: if the permission takes an argument, then this is the target object when invoked to do an edge traversal permission check.

Source source_block : 'sources' '{' source_items '}' source_item: IDENT '(' source_node_annotation [',' ... ] ')' ';'|IDENT '::' IDENT '(' source_edge_annotation [',' ... ] ')' ';' source_node_annotation : 'fbtype' ':' int|'external' source_edge_annotation : 'assoc' ':' int|'empty'|'external'

"Source" is a top-level block. Sources blocks specify the data source for nodes and edges. Every "Node" and "Edge" must have a corresponding "source_item" entry.

The first form of "source_item" specifies the source for nodes, and the second form specifies the source for edges. The possible values are:

"empty": the edge always returns no element, not backed by an external data source;

"assoc": the contents of the edge is the result of the TAO assoc (association) query with this assoc type;

"fbtype" (Facebook type): the node is mapped to this "fbtype", and object data are retrieved through a TAO object query; and "external": the node or assoc is not fetched using standard TAO methods, but rather uses runtime-dependent methods.

Constant constants_block : 'constants' IDENT '{' constants_items '}' constants_item: type IDENT '=' static_expr ';'|'enum' IDENT '{' enum_item [',' ... ] '}' enum_item: IDENT '=' INT

"Constant" is a top-level block. Constants blocks create a namespace for a set of constants and enumerations.

Constant values can be assigned a static value. This includes string and integer literals, references to other constants and "enum" (enumeration) values, and set literals. "Constants" are static in nature, with values independent of the executing content such as the specific viewer or owner.

External external_block : 'externals' '{' external_item '}' external_item : type IDENT '(' type [',' ... ] ')'

"External" is a top-level block. External block declares functions that are implemented by the runtime.

Statement: allow/deny all all_stmt: ('allow'|'deny') 'all' ';'

Unconditionally return with "true" (e.g., if allow) or "false" (e.g., if deny) respectively.

Statement: conditional cond_stmt: ('allow'|'deny') 'if' expr ';'

Returns "true" or "false" when the condition expression is "true".

|  | condition |
| --- | --- |
|  | true\|false\|Unknown |
| allow | true\|skip\|skip |
| deny | false\|skip\|false |

Statement: return . . . if . . .

return_stmt: 'return' expr 'if' expr ';'

Returns the first argument ("result") if the second argument ("condition") is "true". Otherwise, continue.

| condition | result |
| --- | --- |
|  | true\|false\|Unknown |
| true | true\|false\|false |
| false | skip\|skip\|skip |
| Unknown | skip\|false\|false |

Expression: Boolean Operations

The boolean operations are: "&&" (and), "\|\|" (or), and "!" (not).

Boolean operations handle Unknowns gracefully.

Logical AND (&&):

| && | true | false | Unknown |
| --- | --- | --- | --- |
| true | true | false | Unknown |
| false | false | false | false |
| Unknown | Unknown | false | Unknown |

Logical OR (\|\|):

| \|\| | true | false | Unknown |
| --- | --- | --- | --- |
| true | true | true | true |
| false | true | false | Unknown |
| Unknown | true | Unknown | Unknown |

Logical NOT (!):

| ! | true | false | Unknown |
| --- | --- | --- | --- |
|  | false | true | Unknown |

Expression: Equality Comparison

The general comparison operators are "==" (equal), and "!=" (not equal).

Only values of the same type can be compared.

Comparison between objects is done by comparing their IDs. If these objects have no IDs (i.e., special objects generated by the runtime), then the behavior is undefined.

Comparison between sets is done by comparing the objects in each set.

Comparison between other primitive types ("Int", "String", "Bool") is done in the usual manner.

If any of the arguments is "Unknown" (or, in the case of sets, "Incomplete"), the comparison returns "Unknown".

Expression: Binary Arithmetic Operations

Arithmetic operators are defined for "Int" arguments. They are: "+", "−", "*", "/", "<", "<=", ">", and ">=", and behave in the expected manner.

If any of the arguments is "Unknown", the comparison returns "Unknown".

Expression: Binary Set Operations

The set operations are:

"in": test if the left-hand-side (lhs) value is in the right-hand-side (rhs) "Set", using equality as defined previously; if the value is not found and the set is "Incomplete", returns "Unknown";

"intersect": returns a "Set" that includes elements found only in both sets;

"union": returns a "Set" that includes elements of both sets; and

"without": returns a "Set" that includes the values in the lhs "Set" but not in the rhs "Set"; if the rhs "Set" is "Incomplete", an empty "Set" with the "Incomplete" flag set is returned.

Expression: Set Literals expr_set :: '{' expr [',' ... ] '}'

Returns a "Set" whose elements are the result of the expressions.

If any of the expression returns "Unknown", the "Set" is marked "Incomplete" and that element is not added.

Expression: Filter expr_filter :: '{' IDENT 'in' expr 'if' expr '}'

For the expression {var in expr if pred}, filter the contents of the "Set" returned by "expr" using "pred", and return the "Set" of values for which the predicate evaluates to true.

In the body of the predicate, "var" is bound to the current item being tested.

If the input is incomplete (e.g., marked by the "Incomplete" flag), the output is also marked incomplete. If the predicate returns "Unknown" for an element, that element is not added to the result "Set" and the result is marked incomplete.

Expression: Variable var : IDENT|IDENT '::' var

Variables cannot be assigned to. There is a set of variables that is bound in expression contexts. Use the scoping form to refer to constants and "enum" values.

Expression: Accessing Attribute expr_access : expr '.' IDENT

Accessing properties generally results in a data fetch for that object.

Accessing edges generally results in an assoc get request to TAO.

Expression: Calling expr_call : expr '(' expr [',' ... ] ')'|expr. IDENT '(' ')'

The first form calls an external function.

The second form calls a permission check on the lhs object.

Graph

Figure 2:
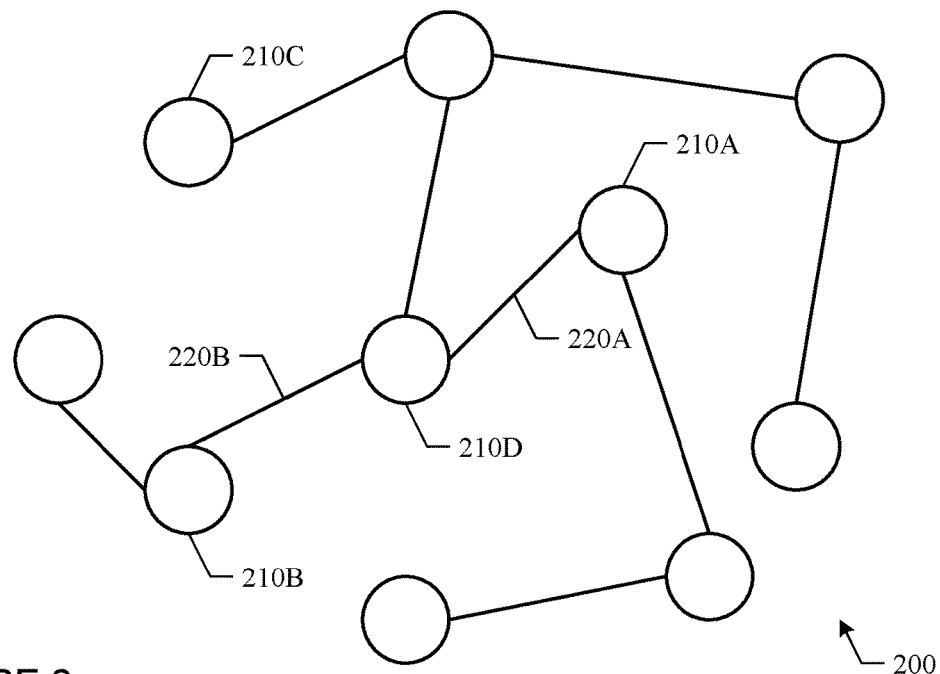
FIG. 2 illustrates an example graph having a number of nodes and edges.

In particular embodiments, information stored in a distributed system may be repressed using a graph have any number of nodes and edges. In the case of a social-networking system (e.g., the Facebook system), such graph may be referred to as a social graph. FIG. 2 illustrates an example graph 200 having a few nodes 210 and edges 220, with each edge 220 connecting two specific nodes 210. In particular embodiments, each node 210 represents an object (e.g., a user, a piece of information, an access rule, a web page, a file, a message, etc.). If there is a direct interaction or relationship between two objects (e.g., two users, two pieces of information, a user and a piece of information), then an edge 220 connects the two corresponding nodes 210 respectively representing the two objects. There may be different types of objects, and thus different types of nodes in graph 200. Similarly, there may be different types of interactions or relationships, and thus different types of edges in graph 200. In addition, for each edge 220, there may be associated data indicating how strong the interaction is between the two objects represented by the two corresponding nodes 210 linked by that edge 220. In some implementations, given two nodes 210, an affinity may be determined between these two nodes 210, whether or not there is an edge 220 directly connecting these two nodes 220. In some implementations, the affinity between two nodes 210 may be determined based on past interactions among the objects represented by some or all of nodes 210 in the graph.

In particular embodiments, each piece of information stored in the system may be similarly represented as a node in the graph. As an example, suppose that in FIG. 2, nodes 210A, 210B, and 210C represent three different users, User A, User B, and User C, respectively, and node 210D represents a status update posted by User A. In this case, User A is the owner of the status update, and thus edge 220A links nodes 210A and 210D because there is an interaction between User A and the status update (e.g., User A has posted the status update). In addition, further suppose that User A has specified access or privacy rules for the status update he has posted. Specifically, the status update can be shared with User B but not with User C. These access rules may also be reflected or stored in graph 200. For example, edge 220B links nodes 210B and 210D, indicating that the status update can be shared with User B (e.g., User B can view the status update). On the other hand, there is no edge linking nodes 210C and 210D because User C is not authorized to view the status update. In this example, edges 220A and 220B are two different types of edges, indicating two different types of relationships between the nodes linked by them. Edge 220A indicates that node 210A, representing User A, has posted and is the owner of node 210D, representing the status update. Edge 220B indicates that node 210B, representing User B, is authorized to access node 210D, representing the status update.

In particular embodiments, different types of nodes and edges in the graph may be defined according to the language described above (i.e., the SPS language). As an example, for the type of node representing a user, it may be defined as:

```
node User {
    // The properties of the node.
    prop {
        String name;      // native types
        Int version;
        Bool some_boolean;
        PrivacySetting master_privacy;    // type "PrivacySetting" is defined separately
    }
    // The edges allowed to originate from the node.
    edge {
        Set<User> friends;   // set of first type of edges to other User nodes who are "friends" of this User
        Set<User> blocked_by_users;   // set of second type of edges to other User nodes who block this User
        Set<User> blocks_users;   // set of third type of edges to other User
```

```
nodes who are blocked by this User
        Set<Application> apps_owned_by;    // set of fourth type of edges to
other Application nodes owned by this User
        ContactInfo contact_info;    // singleton edge
        }
    // Expressions for the node.
    // Expressions are for the most part a series of statements of the form return <bool> if
<predicate> where the predicates are either set operations or other expressions.
    Bool is_blocked {
        false if viewer == null;    // viewer is special, it has to be passed in to
any call
        true if this in viewer.blocked_by_users;
        true if viewer in this.blocks_users;
        else false;
    }
        // Control access to different properties and edges and other items.
        // Alternatively, access to different properties and edges may be controlled based on the
results of different expressions.
    Bool can_be_seen {
        true if viewer == this;
            false if is_blocked;
            else true;
        }
    // There may be additional expressions and operations defined for the node.
}
```

Each node (e.g., nodes 210 in FIG. 2) representing a specific user may be represented as an instance of the "User" object defined above. Different instances of the "User" object may have their variables (e.g., property or edge variables) set to different values according to the specific users they represent.

In particular embodiments, there is a type of node in the graph that represents an object that specifies access rules for other types of nodes (e.g., users, pieces of information). Each privacy setting may be an instance of this type of node. The privacy setting for another node (e.g., representing a user) may reference an appropriate node of such type, which is evaluated in the same context (e.g., the same "viewer") at runtime. As an example, the following is a simplified version of the type of node, named "PrivacySetting", representing the object that specifies access rules for other type nodes.

```
node PrivacySetting {
    prop {
        Bool friends_allowed;
        Bool friends_of_friends_allowed;
        Bool everyone_allowed;
        Object object;    // the object this setting applies to
    }
    edge {
        Set<User> excluded;
        Set<User> included;
        Set<Group> groups_included;
    }
    Bool check {
        false if viewer in excluded;
        true if friends_allowed and viewer in
object.owner.friends;
            true if friends_of_friends_allowed and { } !=
viewer.friends 'intersect' object.owner.friends;
            true if viewer in included;
            true if { } != viewer.groups_member_of 'intersect'
groups_included;
            else false;
        }
    }
```

Compilation

In particular embodiments, the users and objects (e.g., represented as nodes in graph 200) as well as the connections between specific users or objects (e.g., represented as edges in graph 200) in a system (e.g., the Facebook system) may be expressed using the SPS language (e.g., by defining appropriate types of "Nodes", "Edges", etc. and instancing these objects). In addition, all the access or privacy rules in the system may be expressed using the same SPS language (e.g., by declaring appropriate "Properties", "Expressions", etc.). The access or privacy rules thus expressed using the SPS language may be collectively referred to as the "schema" for the information access control in the system. The definitions for different types of objects, expressed using the SPS language, may be stored in a file or several files (e.g., the schema file). As an example, the following is an abbreviated version of a schema file, which illustrates the format of the schema.

```
object Event {
    prop {
        String title;
        String description;
        Integer startTime;
        Integer endTime;
    }
    edge {
        IUser owner;
        set<PersonalUser> invitations;
    }
    perm can_be_seen {
        allow if viewer == this.owner;
        deny if viewer in this.owner.blocks;
        allow all;
    }
}
```

In particular embodiments, a compiler compiles the schema (i.e., the access or privacy rules expressed in the SPS language) and turns the schema into an abstract syntax tree (AST). In particular embodiments, the compiler for the schema is implemented using the Haskell programming language. The compiler type checks the schema. In particular embodiments, the SPS language is a strictly typed language. Strictly typed languages prevent certain types of mistakes in the source code in comparison to loosely typed languages (e.g., PHP). This is somewhat important to tasks like privacy checking where mistakes are less tolerable.

When compiling source code written in the SPS language, the compiler type checks the source code against the schema in order to catch possible errors in the source code that do not agree with what has been defined in the schema. In some implementations, the compiler takes the schema code, which may be expressed in a high level domain specific language, and maps it into a simpler form that is more suitable for evaluation. In fact, any tool that makes such a transformation function as the compiler.

In particular embodiments, the AST of the SPS language may be similar to that of a generic programming language. As an example, the AST may be a Boolean tree of set operations, the evaluation of which requires data fetches from the backing storage (e.g., where the information is stored). The AST may have a predefined syntax.

In some implementations, the AST is expressed as PHP code. The PHP code may reference various PHP libraries and implement functions that compute privacy checks. As an example, a compiler takes the files with the access rules (e.g., the schema) and outputs PHP code The PHP code is saved into the WWW repository. This PHP code references various PHP libraries and computes privacy checks.

Alternatively, in some implementations, the AST may be expressed as C++ code (e.g., with "Nodes", "Edges", etc. defined as various C++ classes). For example, a compiler takes the files with the access rules and outputs C++ code. The C++ code is then compiled to a ".so" file using a C++ compiler (e.g., gcc), which may then be deployed to appropriate servers in the system. A ".so" file is a "shared object" file, which is a dynamically loadable code library format commonly used by many computer programs. The C++ code may reference various runtime C or C++ libraries. At runtime, the ".so" file is loaded into a server shell or PHP extension that includes basic runtime functionalities such as fetching data from storage, reporting status, etc. In some cases, there is a server shell that receives client requests on a Thrift interface and sends them to the ".so" file with the rules. One of the things that the access rules do is fetch data from data storage or data cache server (e.g., TAO). The ".so" code calls back into the server shell, so that the ".so" code is not dependent on a particular version of TAO.

Alternatively, in some implementations, the AST is expressed in a human-friendly language that is easily readable and understandable.

In particular embodiments, in a distributed system, copies the code expressing the schema as well as the graph may be stored on multiple servers located at different geographical locations.

Runtime

In particular embodiments, the runtime is a server shell that, among others, loads the code expressing the schema with the access rule logic. For example, if the schema has been compiled into a ".so" file in the case of using C++ code to express AST, the ".so" file is loaded into the server shell. A server takes requests, sent from clients over the web tier and fetches data from storage (e.g., TAO) as necessary. The server does privacy checks and returns the requested objects (e.g., a piece of information) only if a request passes the check according to appropriate privacy rules. Thus, the requested object is sent to a client only if the request passes the privacy check according to the privacy rules associated with the object.

Suppose that a user, User A, desires to access a piece of information, Information Piece B. In particular embodiments, User A may send a request or query for Information Piece B to a server using a client associated with User A. In some implementations, a query may be expressed in a high-level, declarative form to minimize the amount of data that are sent between the storage (for storing the information) and web (for interfacing with clients) tiers. In some implementations, the query may include a single statement. The query identifies the user requesting the object. As an example, the following code generates a serialized query, which is eventually sent to the data storage tier and executes all of the components of the query, enabling global query planning and minimizing the amount of non-display data sent to the web tier. The user sending the request is identified as "$me" (e.g., using the ID of User A) in the query.

```
GraphQuery::newTaoGraphQuery($me)
    ->get('friends')
    ->sort(COEFFICIENT)
    ->slice(0, 25)
    ->get('photos_tagged_in')
    ->sort(TIME)
    ->slice(0, 10)
```

As another example, the following is a simplified function prototype for requesting a piece of information on behalf of a user. Here, "viewer_id" is used to populate the "viewer" variable in the SPS language; and "object id" is used to identify the requested object.

```
object GetObject(object_id, viewer_id);
```

As a third example, an interface may be defined to request multiple objects per request. For example, a request may ask for "all photographs posted by User A".

In particular embodiments, the code compiled from AST is evaluated at runtime. This code may be referred to as an "intermediate language" or "bytecode". When a server conducts the privacy check for a piece of information requested by a user, the bytecode is evaluated to determine whether the user is authorized to access the requested piece of information. The server loads the bytecode for the type of object requested and evaluates it.

In particular embodiments, evaluation of the bytecode involves fetching data and doing set operations (e.g., "in", "intersect"). It is not always necessary to evaluate all nodes of the bytecode (i.e., the Boolean tree) to get a definitive result. For example, any one term of a logical OR ("||") expression being true is sufficient to make the entire expression true. This may lead to algorithms that can improve the efficiency of the tree-evaluation process based on the cost of fetching data in a distributed system. In particular embodiments, a three-state system is used to handle the Boolean tree and its evaluation at runtime when data-fetching errors are countered, which may occur from time to time, especially in a distributed system. In some implementations, during data fetching, when a fetch error is countered, the error is propagated through the bytecode as the tree is evaluated. This may help give a definitive answer in many cases even when not all data fetches are definitive. More specifically, in particular embodiments, when each function is specified, there is a detailed specification of how the function should behave when an undefined value is taken as input. Thus, when an error is encountered and an undefined value is used as an input to the function, the function is able to handle such undefined value and the error caused it appropriately, thus recovering from the error.

As an example, an evaluation rule may state: "TRUE if a in b or not c in d". To evaluate this rule, first, sets b and d are loaded from storage. A possible error case that may occur in this load step is that some but not all of a set (e.g., set b) is loaded. When this happens, the representation of set b includes the objects that have been able to be loaded, and a marker that the load was incomplete (e.g., using the "Incomplete" flag). In this case, an existence check (e.g., a in b, using the "in" binary set operation)) can return a definitive true, but not a definitive false. Specifically, if a is found in the incomplete set b, it may be inferred that a is definitely in the complete set b. However, if a is not found in the incomplete set b, a may still be in the complete set b (e.g., one of those objects in set b failed to be loaded). Thus, to ask "a in b" when set b is potentially incomplete, the possible returns are "true" or "incomplete". Moreover, in this example, if set b is incomplete, the evaluation may still receive a "true" return. But if set d is incomplete, the evaluation can never get a "true" return. In particular embodiments, the set operations are defined such that they correctly honor this notion of incompleteness, and correctly propagate it to dependent operators.

In particular embodiments, careful specification of how functions and operators should behave allows for speculative execution of sub-expressions for the purpose of optimizing overall latency. In some implementations, speculative execution may be used in CPUs to load data from memory for those branches that it is not yet known whether the branches have to be evaluated. Similarly, speculative execution may be used to load data from remote storage before knowing the data are needed. For example, in the case of "a && b", if a evaluates to FALSE, then the evaluation of b is not needed. But if a evaluates to TRUE, b needs to be evaluated. Hence, one strategy is to evaluate both a and b at the same time, and if one side finishes with "FALSE", the evaluation of the other operand can be immediately cancelled. This is in contrast to evaluating a, and then b, in which case a and b are evaluated in sequence, instead of in parallel. Consequently, this system also provides for "automatic parallelization".

Figure 3:
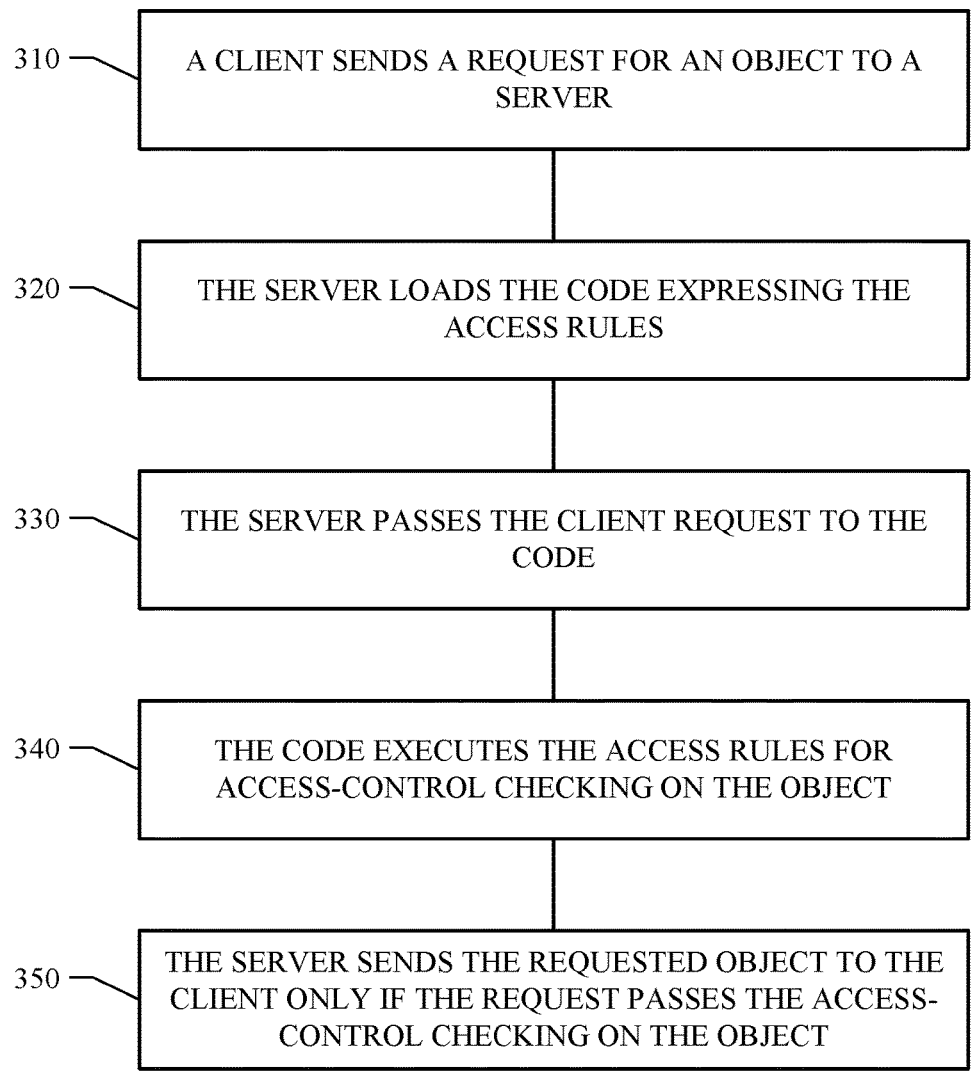
FIG. 3 illustrates an example process for servicing a request from a client.

FIG. 3 illustrates an example process for servicing a client request for an object. In particular embodiments, suppose that a client desires to fetch an object (e.g., a piece of information) and thus sends a request to a server, as illustrated in STEP 310. In some implementations, the request may be a Thrift request. In some implementations, the client may invoke the appropriate PHP server-side script for sending the request. The request may identify the requested object and the client or the user associated with the client. Upon receiving the client request, the server may load the code that expresses the access rules, as illustrated in STEP 320. In some implementations, the access rules have been compiled into C++ code and then compiled into a ".so" file. The server thus loads the most-recent version of the ".so" code, if it has not been loaded already. The server then passes the client request to the code expressing the access rules (e.g., the ".so" code), as illustrated in STEP 330.

In particular embodiments, the code expressing the access rules executes the rules for access-control or privacy checking on the requested object, as illustrated in STEP 340. In some implementations, executing the rules may involve fetching data from storage or memory cache. The ".so" code calls back to the server for the data fetches. In particular embodiments, the evaluation system handles data fetching from storage services based on the data required to evaluate particular sub-expressions in the privacy rules. This is in contrast to code written using generic programming languages (e.g., PHP) in which data fetching is implemented in the same code that expresses the actual privacy logic itself.

The server sends the data-fetching requests to the data storage (e.g., using a data-storage client). In a distributed system, there may be multiple clusters of data storages located in different geographical locations. The server may choose to send the data-fetching requests to a cluster that is geographically close to its own location (e.g., to improve performance). In some implementations, executing the access rules involves evaluating a series of Boolean operations. Based on the final result of the Boolean operations (e.g., True, False, Unknown), the server may determine whether the client or its associated user is authorized to access the requested object. The server sends the requested object to the client only if the client or its associated user is authorized to access the object (e.g., the request passes the access-control checking according to the access rules), as illustrated in STEP 350.

Figure 4:
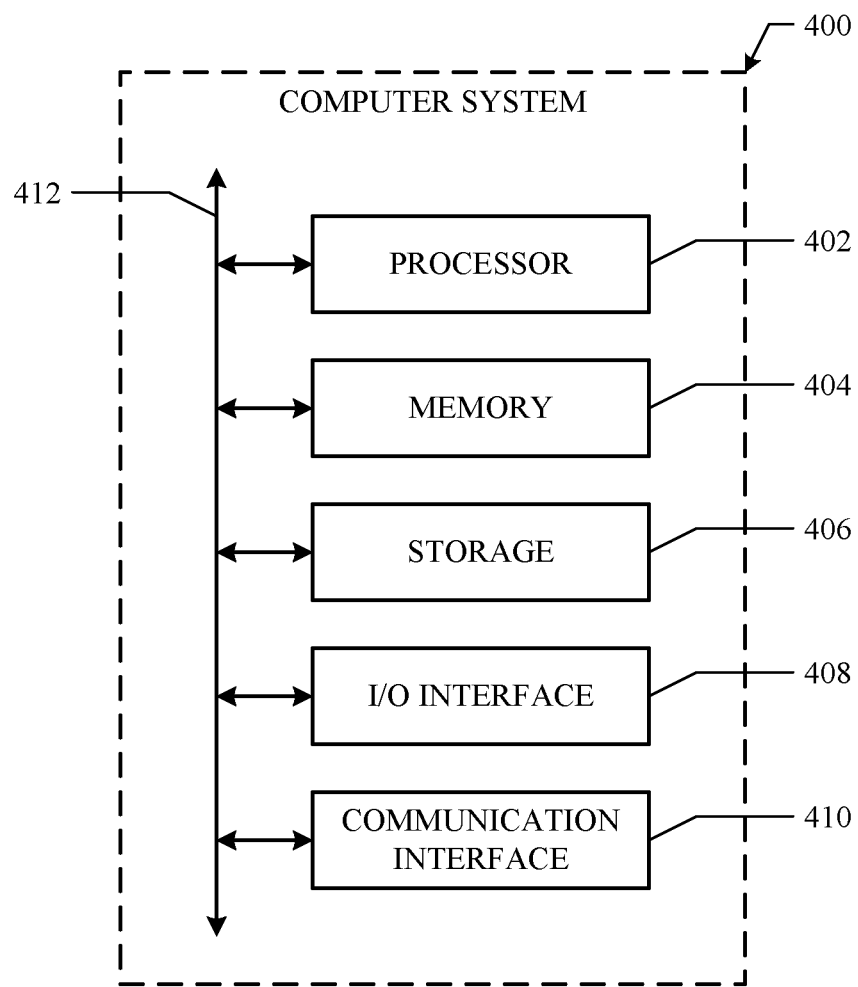
FIG. 4 illustrates an example computer system.

Particular embodiments may be implemented on one or more computer systems. For example, the process illustrated in FIG. 3 may be implemented as computer software and executed on one or more computer systems. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to computer-readable storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   storing access control code defining access control rules applied to a plurality of nodes in a graph, the graph comprising the plurality of nodes and one or more edges, and the plurality of nodes comprising:
   a first node representing a user,
   a second node representing an object linked to the user by an edge of the one or more edges, and
   a third node representing one or more of the access control rules associated with at least one of the user and the object, the third node further representing:
   code defining each of the access control rules as a set of operations, wherein each operation for an access control rule returns (1) when the operation is resolved, a predetermined result, wherein the predetermined result comprises a value representing a true or a false value, and (2) when the operation is not resolved, a not definitive result, wherein the not definitive result is an indication that the operation should be skipped if the operation is not necessary for determining the access control rule;
   compiling the access control code;
   loading the compiled access control code for execution;
   receiving a query for the object;
   executing the compiled access control code to evaluate, for one of the access control rules, the corresponding set of operations that have not been skipped;
   determining, for each of the one or more access control rules, a rule-result comprising a value representing a true or a false value;
   determining a final result based on the one or more rule-results of the one or more access control rules, the final result indicating an allow-result or a deny-result; and
   sending the object when the final result evaluates to an allow-result.

2. The method of claim 1, wherein the code defining each of the access control rules is strictly typed.

3. The method of claim 1, wherein the compiled access control code is stored as a .so file.

4. The method of claim 1, wherein the compiled access control code is loaded into a server shell for execution.

5. The method of claim 1, wherein a first operation and a second operation of a particular rule are evaluated in parallel.

6. The method of claim 5, wherein the second operation is skipped if the first operation is resolved first and returns a predetermined result that renders the second operation unnecessary.

7. A system comprising: one or more processors; and a memory coupled to the processors comprising instructions executable by the processors, the processors being operable when executing the instructions to:
   store access control code defining access control rules applied to a plurality of nodes in a graph, the graph comprising the plurality of nodes and one or more edges, and the plurality of nodes comprising:
   a first node representing a user,
   a second node representing an object linked to the user by an edge of the one or more edges, and a third node representing one or more of the access control rules associated with at least one of the user and the object, the third node further representing:
    code defining each of the access control rules as a set of operations, wherein each operation for an access control rule returns (1) when the operation is resolved, a predetermined result, wherein the predetermined result comprises a value representing a true or a false value, and (2) when the operation is not resolved, a not definitive result, wherein the not definitive result is an indication that the operation should be skipped if the operation is not necessary for determining the access control rule;

compile the access control code;
load the compiled access control code for execution;
receive a query for the object;
execute the compiled access control code to evaluate, for one of the access control rules, the corresponding set of operations that have not been skipped;
determine, for each of the one or more access control rules, a rule-result comprising a value representing a true or a false value;
determine a final result based on the one or more rule-results of the one or more access control rules, the final result indicating an allow-result or a deny-result; and
send the object when the final result evaluates to an allow-result.

8. The system of claim 7, wherein the code defining each of the access control rules is strictly typed.

9. The system of claim 7, wherein the compiled access control code is stored as a .so file.

10. The system of claim 7, wherein the compiled access control code is loaded into a server shell for execution.

11. The system of claim 7, wherein a first operation and a second operation of a particular rule are evaluated in parallel.

12. The system of claim 11, wherein the second operation is skipped if the first operation is resolved first and returns a predetermined result that renders the second operation unnecessary.

13. One or more computer-readable non-transitory storage media embodying software that is operable when executed to:
    store access control code defining access control rules applied to a plurality of nodes in a graph, the graph comprising the plurality of nodes and one or more edges, and the plurality of nodes comprising:
    a first node representing a user,
    a second node representing an object linked to the user by an edge of the one or more edges, and
    a third node representing one or more of the access control rules associated with at least one of the user and the object, the third node further representing:
        code defining each of the access control rules as a set of operations, wherein each operation for an access control rule returns (1) when the operation is resolved, a predetermined result, wherein the predetermined result comprises a value representing a true or a false value, and (2) when the operation is not resolved, a not definitive result, wherein the not definitive result is an indication that the operation should be skipped if the operation is not necessary for determining the access control rule;

compile the access control code;
load the compiled access control code for execution;
receive a query for the object;
execute the compiled access control code to evaluate, for one of the access control rules, the corresponding set of operations that have not been skipped;
determine, for each of the one or more access control rules, a rule-result comprising a value representing a true or a false value;
determine a final result based on the one or more rule-results of the one or more access control rules, the final result indicating an allow-result or a deny-result; and
send the object when the final result evaluates to an allow-result.

14. The media of claim 13, wherein the code defining each of the access control rules is strictly typed.

15. The media of claim 13, wherein the compiled access control code is stored as a .so file.

16. The media of claim 13, wherein the compiled code is loaded into a server shell for execution.

17. The media of claim 13, wherein a first operation and a second operation of a particular rule are evaluated in parallel.

18. The media of claim 17, wherein the second operation is skipped if the first operation is resolved first and returns a predetermined result that renders the second operation unnecessary.

\* \* \* \* \*